US012577920B2

(12) United States Patent
Brunocilla et al.

(10) Patent No.: US 12,577,920 B2
(45) Date of Patent: Mar. 17, 2026

(54) METHOD FOR DIAGNOSING FAULTS IN THE OPERATION OF A FUEL HEATING SYSTEM ASSOCIATED WITH AN INTERNAL COMBUSTION ENGINE

(71) Applicant: Robert Bosch Limitada, Campinas (BR)

(72) Inventors: Marcello Francisco Brunocilla, Indaiatuba (BR); Renato Alves De Souza, Campinas (BR)

(73) Assignee: Robert Bosch Limitada, Campinas (BR)

( * ) Notice: Subject to any disclaimer, the term of this patent is extended or adjusted under 35 U.S.C. 154(b) by 0 days.

(21) Appl. No.: 18/721,074

(22) PCT Filed: Nov. 3, 2022

(86) PCT No.: PCT/BR2022/050423
§ 371 (c)(1),
(2) Date: Jun. 17, 2024

(87) PCT Pub. No.: WO2023/115181
PCT Pub. Date: Jun. 29, 2023

(65) Prior Publication Data

US 2025/0067228 A1 Feb. 27, 2025

(30) Foreign Application Priority Data

Dec. 20, 2021 (BR) .......................... 1020210258519

(51) Int. Cl.
*F02D 41/22* (2006.01)
*F02M 31/125* (2006.01)

(52) U.S. Cl.
CPC .......... *F02D 41/22* (2013.01); *F02M 31/125* (2013.01); *F02D 2041/224* (2013.01)

(58) Field of Classification Search
CPC .. F02D 41/22; F02D 2041/224; F02M 31/125
See application file for complete search history.

(56) References Cited

U.S. PATENT DOCUMENTS 9,879,641 B2 1/2018 Ham et al.
10,443,530 B1 10/2019 Li et al.
(Continued)

FOREIGN PATENT DOCUMENTS

BR PI0600645 A 2/2007
BR PI0700422 A 9/2008
(Continued)

OTHER PUBLICATIONS

International Search Report for Application No. PCT/BR2022/050423 dated Mar. 8, 2023 (9 pages including English translation).
(Continued)

*Primary Examiner* — Kevin A Lathers
(74) *Attorney, Agent, or Firm* — Michael Best & Friedrich LLP

(57) ABSTRACT

This invention refers to a method for diagnosing faults in the operation of a fuel heating system associated with an internal combustion engine, that includes a plurality of routines to detection of several kinds of faults. The relevant concern is to provide a sufficiently robust solution implemented by computer, to conceive a fuel heating system that includes a main control unit and a heating control unit independent from each other, both comprising respective “intelligences” so that this latter is particularly able to perform several functions and/or routines relating to the self-diagnostic of the heating system. For such, a method for self-diagnostic of fuel heating system that includes at least one engine control unit ECU that includes a respective microcontroller, and at least one heating control unit HCU that includes a respective microcontroller, both fed by at least one tension source 10 interconnected to each other and to the at least heating (Continued)

element 13 through an electronic circuit that still includes, at least, one main relay 11 and at least one secondary relay 12.

16 Claims, 1 Drawing Sheet

(56) References Cited

U.S. PATENT DOCUMENTS

| | | | | |
|---|---|---|---|---|
| 2004/0074465 | A1* | 4/2004 | Hunt | F02M 69/325 123/179.15 |
| 2009/0076680 | A1 | 3/2009 | Kernwein | |
| 2010/0018962 | A1* | 1/2010 | Kabasin | G05D 23/24 219/482 |
| 2011/0276252 | A1 | 11/2011 | Kabasin et al. | |
| 2012/0143432 | A1 | 6/2012 | Yoon et al. | |
| 2020/0275527 | A1 | 8/2020 | Sakamoto | |

FOREIGN PATENT DOCUMENTS

| | | | |
|---|---|---|---|
| BR | PI0902488 | A2 | 4/2010 |
| BR | 102017006766 | A2 | 10/2018 |
| BR | 102018075605 | A2 | 6/2020 |
| BR | 102018077092 | A2 | 7/2020 |
| BR | 102018077109 | A2 | 7/2020 |
| BR | 102019027845 | A2 | 7/2021 |
| CN | 111997757 | A | 11/2020 |
| EP | 0631213 | B1 | 10/2001 |
| EP | 1134589 | B1 | 3/2005 |
| JP | H08284766 | A | 10/1996 |
| WO | 2006130938 | A1 | 12/2006 |
| WO | 2019150330 | A1 | 8/2019 |

OTHER PUBLICATIONS

International Preliminary Report on Patentability for Application No. PCT/BR2022/050423 dated Mar. 16, 2024 (8 pages including English translation).

* cited by examiner

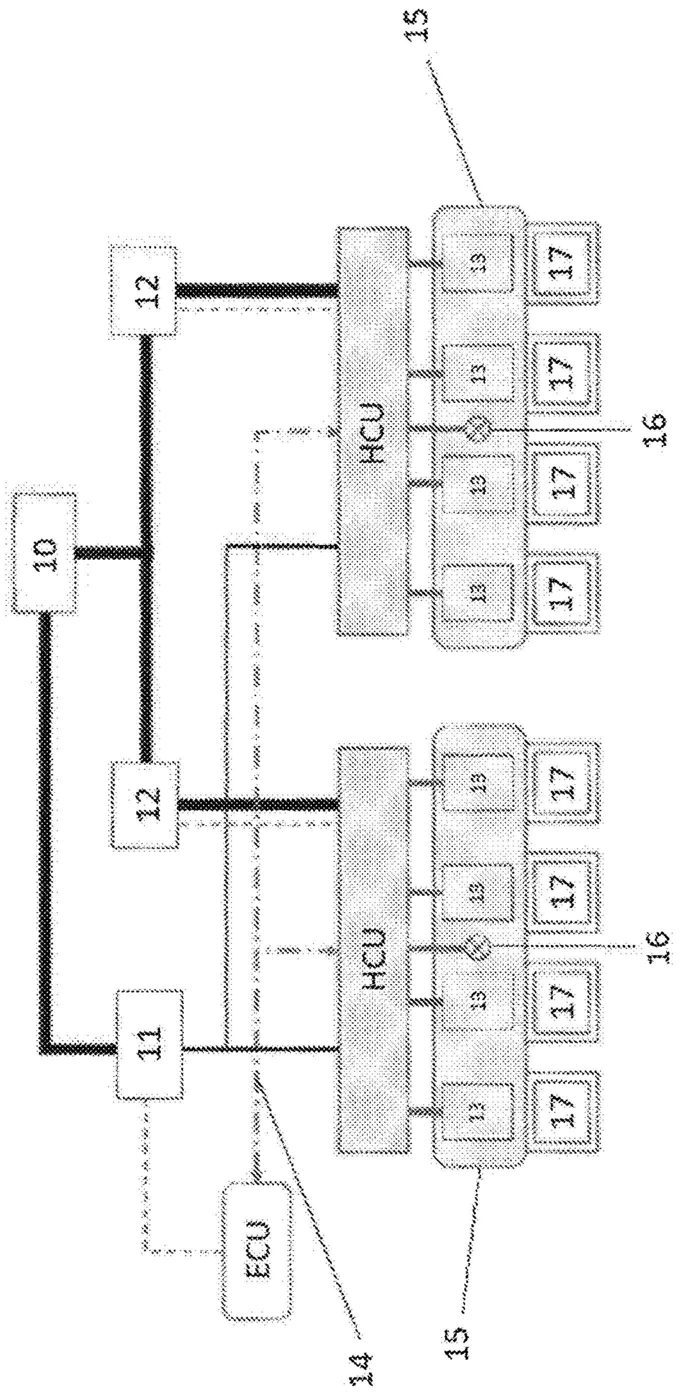
10
11
12
12
HCU
HCU
13
14
15
15
16
16
17
ECU

METHOD FOR DIAGNOSING FAULTS IN THE OPERATION OF A FUEL HEATING SYSTEM ASSOCIATED WITH AN INTERNAL COMBUSTION ENGINE

BACKGROUND

This invention refers to a fault diagnosis method in the operation of a fuel heating system associated with an internal combustion engine, including a plurality of routines for detection of several kinds of faults relating to the heating elements from the heating control unit itself (and its data connection means) and/or from the relay associated with this latter.

Internal combustion engines are thermal machines commonly associated with motor vehicles, that convert thermal energy produced by fuel combustion into mechanical energy. For instance, Otto-cycle engines usually operate with gas, and require the action from a sparkle to provoke combustion, generated by a device known as sparking plug. Currently, vehicles powered by Otto-cycle engines often use alternative fuels, such as ethanol, either on an isolate basis or mixed with gas, that require a heating system before injection into the fuel chamber, either to facilitate start at low temperatures or to improve burning, thus reducing the issuance of pollutants. This fuel heating inside the gallery or the fuel distribution line is performed by glow plugs.

Parallelly, diesel engines are self-ignition engines that do not require sparkles to start combustion. In this case, the increased temperature itself provoked by the air compression inside the cylinders promotes diesel combustion. Nevertheless, at low temperatures, it can be hard to start diesel engines, as the mass of cylinder block and of the cylinder head absorb part of the heat resulting from air compression, thus preventing fuel ignition. Heater plugs are also often used to increase temperature as required for the diesel combustion.

Modern internal combustion engines, with electronic injection systems, comprise a main control unit known as engine control unit (ECU) to control a series of engine actuators and ensure an optimal performance thereof. Among other functions, the ECU controls the opening and closure of the engine injector valves to determine the amount of fuel to be injected, according to a plurality of information obtained by sensors. ECU usually operates with low-power signals.

Another component usually found in fuel feeding systems comprising a fuel heating step is a secondary control unit also known as heating control unit (HCU), that operates as a control element for the high currents drained by the heaters. HCU is electrically connected to a battery, to the ECU and to heating elements, such as glow plugs.

Upon receipt of the low-power signal from the ECU through feeding of the electric current generated by the battery, HCU carries the battery tension to the glow plugs, thus heating them and consequently transferring heat to the fuel in contact with these latter, to increase the temperature thereof.

The patent document BRPI0700422 discloses a system of this type. More specifically, said document describes a start control system for combustion engines comprising a control electronic unit of fuel injection inside the engine, at least one fuel heater placed in contact with fuel and a fuel heating control unit connected through at least one data connection mean to the injection control electronic unit and electrically connected to at least one fuel heater, wherein the fuel heating control unit controls the operation of at least one fuel heater, by adjusting fuel temperature at an amount optimal for start.

In addition to the starting moment under a transient regime, it is also known that heating fuel prior to the injection thereof into the combustion chamber is an efficient technique to provide a more suitable fuel burning during the engine operation under a permanent regime, as previously mentioned.

In fact, fuel heating is intended to improve atomization of the injected fuel spray thus reducing the size of its drops, meaning a better preparation of a more homogeneous air-fuel mixture. This will result into a reduced amount of injected fuel, with a decrease in the amount of gases and particulates issued.

In this respect, some solutions are well known, such as the one disclosed by the patent document BRPI0902488. This document describes a fuel heater for internal combustion engines comprising a device to determine the fuel temperature and pressure, to adjust the fuel target temperature according to the fuel pressure as detected by a pressure sensor, and a device for fuel temperature control, that controls the fuel heater to adjust the temperature detected by a sensor to the fuel target temperature.

In the context of these patent documents, however, there is a need to provide a system and/or method for monitoring and diagnosing faults in such fuel heating systems. Some solutions relating to this topic are disclosed by documents such as BR102018075605, US2020275527 and US2009076680.

The document BR102018075605 discloses a method to measure electric tension in a heating system for start at cold, wherein such tension measurement allows calculating the current and the electric power of the heating system, identifying electric faults of the heating system and achieving the correct control.

On its turn, the document US2020275527 reveals a solution comprising the respective heating control unit that is able to use specific routines and to identify some parameters for detection of conditions and/or faults arising from short-circuits in the system relating to the grounding or to the battery.

Parallelly, the document US2009076680 reveals, in its theoretical reasons, a fuel heating system including a heating control unit that is able to use specific routines and to identify some parameter to detect conditions and/or faults from short-circuits in the system relating to the grounding or to the battery.

Additionally, the document US2009076680 also describes and applies for protection for a method to track defective functions in the operation of heating elements from a fuel heating system associated with a diesel internal combustion engine, that comprises monitoring at least one operational parameter of the heating elements and/or of the preheating control unit, generating a fault message whenever the monitored operational parameter deviates from a predefined nominal amount or nominal status of the operational parameter; storing a fault message associated with a time parameter; searching other fault messages stored inside the vehicle and associated with the same time parameter, and combining the fault messages associated with the same time parameter.

As disclosed by said document, upon simultaneous occurrence of different faults, the invention provides an indication of functional and causal relationships between the simultaneous faults, thus facilitating the diagnostic of the cause of the failures and the repair thereof.

Said document US2009076680 also mentions that faults can be detected by monitoring the current/resistance to said heating elements, among other possible operational parameters, such as feeding tension, heating elements temperature, resistance of the electric circuit lines that feed the heating elements, temperature of the heating control unit and/or temperature of the semiconductors responsible for carrying electric current to the heating elements.

Although the solutions described above have proved to be functional for the purposes for which they were intended to, it is noted that there are still gaps in the state of art with regard to the provision of a sufficiently robust computer-implemented solution for a fuel heating system that includes a main control unit and a heating control unit, independent of each other, and both comprising "intelligences", so that the latter is still able of performing several different functions and/or routines related to the self-diagnosis of the heating system, both during the start-up of the combustion engine and during its operation in permanent regime.

This invention arises within this scenario.

SUMMARY

So, the crucial objective of this invention consists in disclosing a solution for self-diagnostic of a fuel heating system.

Specifically, this invention is intended to disclose a sufficiently robust self-diagnostic method implemented by computer, encompassed by the heating control unit and that is able to perform a plurality of routines.

Another objective of this invention is to provide a self-diagnostic method that is able to identify a plurality of faults relating to the heating elements, to the heating control unit itself (and to its data connection means) and/or to the relay associated with this latter.

Another object is to describe a low-cost and practical solution applicable to heating systems comprising smart. Independent, modular, and autonomous engine control units and heating control units.

The objectives summarized above are achieved through a self-diagnostic method for fuel heating system, including at least one engine control unit including the respective microcontroller and at least one heating control unit including a respective microcontroller, being both fed by at least one tension source and interconnected to each other, with at least one heating element by an electronic circuit still including, at least, one main relay and one secondary relay, wherein the heating control unit is able to perform the diagnostic of at least one heating element; to perform the diagnostic of the operational status of said at least one secondary relay; and to perform the diagnostic of itself and of its respective data connection means.

BRIEF DESCRIPTION OF THE DRAWINGS

This invention is described in detail below, according to the following illustrative FIGURE:

The FIG. 1 illustrates a block diagram with a scheme of the fuel heating system under this invention.

DETAILED DESCRIPTION

This invention refers to a self-diagnostic method for fuel heating system that, as previously clarified, is responsible for heating the fuel to be injected inside an engine, at a target temperature. For such, the system determines the amount of energy to be supplied to the fuel, based on the fuel temperature at the entry inside the gallery, on the fuel flow, on the kind of fuel, among other possible factors. The fuel heating system is operated since the engine start.

This invention is applicable to internal combustion engines applicable to vehicles, wherein said engines have, at least, one fuel transport line that carries an amount of one at least fuel to be injected, either directly or indirectly, inside the combustion chamber, at least one heating element 13 of fuel having a heating chamber, and at least one heating control unit HCU associated with the at least one fuel heating element 13 and to one engine control unit ECU through the at least data connection mean 14, such as a CAN grounding in a preferential manner.

The engine control unit ECU is a main control unit, while the heating control unit HCU is a secondary control unit. Other control units can be associated with them. The engine control unit ECU is connected to a tension source 10 and protected by a main relay 11, while the heating control unit HCU is connected to the same tension source 10 and protected by a secondary relay 12. Said secondary relay 12 is preferably a reverse polarity relay.

Of note, according to this invention both control units ECU and HCU are smart, autonomous and modular between each other. Both have their own hardware comprising the respective microcontrollers among other components, as well as their respective embodied software. In other words, this fuel heating system comprises control units ECU and HCU that are conceived to be independent from each other as to their respective structures and functions, to perform different routines and/or control activities, but to communicate and cooperate. In this respect, it is worth emphasizing that fuel heating operation is neither allowed nor activated whenever the communication between the engine and the heating control units ECU and HCU is interrupted.

So, the mutual limitations to the operations of both control units ECU and HCU are mitigated, with higher levels of freedom in the configuration of the two control units ECU and HCU and the operation thereof. Particularly, the manufacturer of the engine control unit ECU is no longer limited by a machine operating according to a rigid scheme adapted to the heating control unit HCU and vice versa. Therefore, the heating control unit HCU can react to any entry of the engine control unit ECU on an autonomous basis.

The engine control unit ECU is responsible for sending signals to the heating control unit HCU as to the desired fuel temperature (target temperature), as well as signals relating to the status of the system and of the engine, and information relating to the heating elements to be heated. The engine control unit ECU is also responsible for managing accessory/aggregate devices, such as fuel pump, the start-up engine, signaling lamps, electronic injection, among others. Further, the engine control unit ECU is responsible for storing information relating to faults provided by the heating control unit HCU.

The heating control unit HCU is also able to detect fault status related to each of the heating elements 13, internal microcontroller or feeding faults, as well as to stay the fuel feeding, depending on the severity of the faults detected. Last, the heating control unit HCU is able to provide to the main control unit ECU any information relating to the operation of the fuel heating system, including further faults detected.

The heating control unit HCU is also able to activate and deactivate the heating elements 13 individually, according to the engine operation or to the detection of faults, for instance. In this case, the engine control unit ECU sends to the heating control unit HCU any information relating to the heating elements 13 to be activated, while the heating control unit HCU consolidates such information in view of the detection of faults related to ant heating elements 13, and reports back to the engine control unit ECU, through data connection 14, which heating elements 13 are activated.

Through the heating control unit HCU, the relevant fuel heating system is able to control, or, more particularly, to reduce the power as required in case of risk of overheating in components, either from the heating control unit itself HCU or from heating elements. If overheating is detected, the fuel heating process is stayed, as described in detail below.

Likewise, fuel heating is also stayed if the tension source 10, meaning the battery that feeds the whole system, is found to have a capacity/load below a predetermined limit.

Fuel heating shall be also stayed whenever the power stages of the heating control unit HCU or the secondary relays 12 present faults in the light of a predetermined amount of cycles. The fuel heating system must check the status of said secondary relay 12 before starting the heating operation, and, if faults are detected, heating shall not be allowed. Further details are disclosed below.

To briefly reiterate some aspects, the heating control unit HCU is able to provide to the engine control unit ECU, through data connection means 14, signals relating to: control status of the heating system (inactive, active, unable, fault mode, self-diagnostic, etc.), resistance in the heating elements, tension in the heating elements, power in the heating elements, feeding tension, requested control of the secondary relay, fuel temperature at the entry of the gallery 15, fuel temperature at the combustion chambers, temperature of the heating control unit itself HCU, fuel temperature at the heating spot (by channel), status of the heating elements (by channel), status of the feeding terminals of the heating control unit itself HCU and or the power stages, meaning feeding electric terminal to the heating elements 13 or to the secondary relay 12, manner to operate heating, heating status, status of the data connection means processing 14, self-diagnostic status, requested extension of power supply, exceeding temperature status, displacement status of the ground shift and memory errors, for instance.

Last, the heating control unit HCU is able to perform the diagnostic of heating elements 13, as well as of the operational status of the at least secondary relay 12, of itself and of its data connection means 14. So, it performs a complete diagnostic of the whole fuel heating system.

Particularly in order to achieve the aforesaid objectives, namely to manage all the operational requirements of the relevant system and to keep its operation under suitable and healthy conditions, this invention conceives a plurality of system self-diagnostic routines, as described in detail below, wherein all of them are performed if, and only if the vehicle's ignition is turned on, and if the tension source 10 has load enough, meaning a load within a range of predetermined limits.

In a first routine for diagnostic of the at least one heating element 13, said self-diagnostic of fuel heating system comprises the following steps relating to short-circuits in a grounding spot:

check the heating elements 13 by measuring a first electric parameter (current, for instance) at said at least one heating element 13 during the activity thereof, and by comparing the amount with a reference value;

if the measured value exceeds the reference value, verify the need of replacing said at least heating element 13 and/or the need of repairing the short-circuit between the heating control unit HCU and said at least one heating element 13; in this case, one should indicate a diagnostic trouble code (DTC);

if the measured value is below the reference value, check the existence of a previously indicated DTC for this trouble;

if so, consider the fuel heating system under suitable conditions, and suggest checking the connections with heating elements 13;

if not, or after the last step, a malfunction indicator light (MIL) is erased, if the malfunction is not repeated in the conduction cycles during which the diagnostic is performed; the diagnostic trouble code and the freeze frame data are erased by using the clean command from the scanning tool. The trouble diagnostic code and the freeze frame data cannot be erased by disconnecting the tension source 10.

In a second routine for diagnostic of the at least one heating element 13, said self-diagnostic for fuel heating system comprises the following steps relating to the detection of short-circuit in the tension source 10:

check the heating elements 13 by measuring a second electric parameter (tension, for instance) at said at least one heating element 13 while this latter is inactive, and by comparing the amount with a reference value;

if the measured value exceeds zero, verify the need of replacing said at least heating element 13 and/or the need of repairing the short-circuit between the heating control unit HCU and said at least one heating element 13; in this case, one should indicate a diagnostic trouble code;

if the measured value is zero, check the existence of a previously indicated DTC for this trouble;

if so, consider the fuel heating system under suitable conditions, and suggest checking the connections with heating elements 13;

if not, or after the last step, a malfunction indicator light is erased, if the malfunction is not repeated in the conduction cycles during which the diagnostic is performed; the diagnostic trouble code and the freeze frame data are erased by using the clean command from the scanning tool. The trouble diagnostic code and the freeze frame data cannot be erased by disconnecting the tension source 10.

In a third routine for diagnostic of the at least one heating element 13, said self-diagnostic for fuel heating system comprises the following steps relating to the detection of open circuit:

check the heating elements 13 by measuring a first electric parameter (current) at said at least one heating element 13 and by comparing the amount with a reference value;

If, for a non-determined period, the measured value of the second electric parameter (current, for instance) is lower than a reference value (2A, for instance), a fault is reported by the heating control unit HCU to the engine control unit ECU, and the heating system is turned off; in this case, indicate a trouble diagnostic code;

if the measured value of the second electric parameter (current, for instance) is higher than the reference value, check the existence of a previously indicated DTC for this trouble;

if so, consider the fuel heating system under suitable conditions, and suggest checking the connections with heating elements 13;

if not, or after the last step, a malfunction indicator light is erased, if the malfunction is not repeated in the conduction cycles during which the diagnostic is performed; the diagnostic trouble code and the freeze frame data are erased by using the clean command from the scanning tool. The trouble diagnostic code and the freeze frame data cannot be erased by disconnecting the tension source 10.

In a fourth routine for diagnostic of the at least one heating element 13, said self-diagnostic for fuel heating system comprises the following steps relating to overheating detection:

check the heating elements 13 by measuring a third electric parameter (resistance, for instance) at said at least one heating element 13 and by comparing the amount with a reference value;

If, for a non-determined period, the measured value, the measured value is higher than a predetermined limit (such as 0.7 Ohm), measure a first electric parameter (such as current) at said at least one heating element 13; if the first electric parameter is higher than a predetermined limit, a fault is reported by the heating control unit HCU to the engine control unit ECU and the heating system is turned off; in this case, indicate a trouble diagnostic code;

if not, check the existence of a previously indicated TDC for this trouble;

if so, consider the fuel heating system under suitable conditions, and suggest checking the connections with heating elements 13;

if not, or after the last step, a malfunction indicator light is erased, if the malfunction is not repeated in the conduction cycles during which the diagnostic is performed; the diagnostic trouble code and the freeze frame data are erased by using the clean command from the scanning tool. The trouble diagnostic code and the freeze frame data cannot be erased by disconnecting the tension source 10.

In a first routine for diagnostic of the operational status of the at least secondary relay 12, said self-diagnostic method for fuel heating system comprises the following steps:

check said at least secondary relay 12, by measuring a second electric parameter (tension) in a feeding terminal (also known as T30) of the heating control unit HCU, and by comparing it with a reference value;

if, once activated the command to close said at least secondary relay 12, the measured value is null, make sure that the at least secondary relay 12 is locked in a first operational status (open)—in other words, that the secondary relay has its mechanic key in a permanently open operational status—and the heating control unit HCU reports the fault to the engine control unit ECU and turns off the heating system; then indicate a trouble diagnostic code and perform new attempts to close the secondary relay 12. Here, a normal operational status should indicate a measured value above the reference value (higher than 7 V, for instance);

if, once activated the command to open said at least secondary relay 12, the measured value is not null, make sure that the at least secondary relay 12 is locked in a second operational status (closed)—in other words, that the secondary relay has its mechanic key in a permanently closed operational status—and the heating control unit HCU reports the fault to the engine control unit ECU and turns off the heating system; then, indicate a trouble diagnostic code and perform new attempts to close the secondary relay 12. Here, a normal operational status should indicate a measured value being null;

if not for both cases, check the existence of a previously indicated TDC for this trouble;

if so, consider the fuel heating system under suitable conditions, and suggest checking the connections with heating elements 13;

if not, or after the last step, a malfunction indicator light is erased, if the malfunction is not repeated in the conduction cycles during which the diagnostic is performed; the diagnostic trouble code and the freeze frame data are erased by using the clean command from the scanning tool. The trouble diagnostic code and the freeze frame data cannot be erased by disconnecting the tension source 10.

In a first routine for self-diagnostic of the heating control unit itself HCU, said self-diagnostic method for fuel heating comprises the following steps:

check a feeding terminal of the heating control unit HCU, by measuring a second electric parameter (tension, for instance), and by comparing it with reference values;

if, once activated a command to close said at least secondary relay, the measured value is not null and lower than the first reference value (6.5 V, for instance), verify the subtension in the feeding terminal of the heating control unit HCU and this latter reports the fault to the engine control unit ECU and turns off the heating system; then indicate a trouble diagnostic code;

if, once activated a command to close said at least secondary relay, the measured value is not null and lower than a second reference value (such as 3 V), lower than the first reference value, one verifies the non-detection of electric feeding in the feeding terminal of the heating control unit HCU and this latter reports the fault to the engine control unit ECU and turns off the heating system; then, indicate a trouble diagnostic code;

if, once activated a command to close said at least secondary relay, the measured value is not null and higher than a third reference value (such as 16.5 V), one verifies the power overload of electric feeding in the feeding terminal of the heating control unit HCU and this latter reports the fault to the engine control unit ECU and turns off the heating system; then, indicate a trouble diagnostic code;

if not for both cases, check the existence of a previously indicated trouble diagnostic code for this trouble;

if so, consider the fuel heating system under suitable conditions, and suggest checking the connections with heating elements 13;

if not, or after the last step, a malfunction indicator light is erased, if the malfunction is not repeated in the conduction cycles during which the diagnostic is performed; the diagnostic trouble code and the freeze frame data are erased by using the clean command from the scanning tool. The trouble diagnostic code and the freeze frame data cannot be erased by disconnecting the tension source 10.

In a second routine for self-diagnostic of the heating control unit itself HCU, said self-diagnostic method for fuel heating system comprises the following steps relating to overheating detection in a printed circuit board of the heating control unit HCU:

measure the temperature of the printed circuit board from the heating control unit HCU in a region close to the feeding terminal of the heating control unit HCU;

if the measured temperature exceeds a reference value (such as 125° C.), verify overheating, inactivate all the heating elements 13 and the heating control unit HCU reports the fault to the engine control unit ECU; then, indicate a trouble diagnostic code;

if not, check the existence of a previously indicated trouble diagnostic code for this trouble;

if so, consider the fuel heating system under suitable conditions;

if not, or after the last step, a malfunction indicator light is erased, if the malfunction is not repeated in the conduction cycles during which the diagnostic is performed; the diagnostic trouble code and the freeze frame data are erased by using the clean command from the scanning tool. The trouble diagnostic code and the freeze frame data cannot be erased by disconnecting the tension source 10.

In a third routine for self-diagnostic of the heating control unit itself HCU, said self-diagnostic method for fuel heating system comprises the following steps relating to overheating detection in a printed circuit board of the heating control unit HCU:

measure the temperature of the printed circuit board from the heating control unit HCU in a region where the power stages are placed;

if the measured temperature exceeds a reference value (such as 155° C.), verify overheating, inactivate all the heating elements 13 and the heating control unit HCU reports the fault to the engine control unit ECU;

if not, check the existence of a previously indicated trouble diagnostic code for this trouble;

if so, consider the fuel heating system under suitable conditions;

if not, or after the last step, a malfunction indicator light is erased, if the malfunction is not repeated in the conduction cycles during which the diagnostic is performed; the diagnostic trouble code and the freeze frame data are erased by using the clean command from the scanning tool. The trouble diagnostic code and the freeze frame data cannot be erased by disconnecting the tension source 10.

In a fourth routine for self-diagnostic of the heating control unit itself HCU, said self-diagnostic method for fuel heating system comprises the following steps relating to overheating detection in a printed circuit board of the heating control unit HCU:

measure the temperature of the printed circuit board from the heating control unit HCU in a region close to a microcontroller;

if the measured temperature exceeds a reference value (such as 105° C.), verify overheating, inactivate all the heating elements 13 and the heating control unit HCU reports the fault to the engine control unit ECU;

if not, check the existence of a previously indicated trouble diagnostic code for this trouble;

if so, consider the fuel heating system under suitable conditions;

if not, or after the last step, a malfunction indicator light is erased, if the malfunction is not repeated in the conduction cycles during which the diagnostic is performed; the diagnostic trouble code and the freeze frame data are erased by using the clean command from the scanning tool. The trouble diagnostic code and the freeze frame data cannot be erased by disconnecting the tension source 10.

In a fifth routine for self-diagnostic of the heating control unit itself HCU, said method comprises the following steps relating to detection of the ground shift displacement between the heating control unit HCU and a respective grounding spot of said at least one heating element 13:

measure the ground shift displacement between the heating control unit HCU and the respective grounding spot of said at least one heating element 13;

if the measured value exceeds a first reference value (such as 2 V), verify that the ground shift displacement is above a positive limit, report the fault to the engine control unit and turn off the heating system;

if the measured value is below a second reference value (such as −2 V), verify that the ground shift displacement is below a negative limit, report the fault to the engine control unit ECU and turn off the heating system;

if not, for both cases, check the existence of a previously indicated trouble diagnostic code for this trouble;

if so, consider the fuel heating system under suitable conditions, and suggest checking the connections to the heating elements 13;

if not, or after the last step, a malfunction indicator light is erased, if the malfunction is not repeated in the conduction cycles during which the diagnostic is performed; the diagnostic trouble code and the freeze frame data are erased by using the clean command from the scanning tool. The trouble diagnostic code and the freeze frame data cannot be erased by disconnecting the tension source 10.

In a sixth routine for self-diagnostic of the heating control unit itself HCU, said method comprises the following steps relating to error detection in a power stage that feeds said at least one heating element 13:

check, at said power stage, if an electric parameter (current, resistance or tension) is not null, whenever the command from the heating control unit HCU for said at least one heating element 13 corresponds to the operational status turned off;

check, at said power stage, if an electric parameter (current, resistance or tension) is null, whenever the command from the heating control unit HCU for said at least one heating element 13 corresponds to the operational status turned on;

if so for at least one of the above premises, the heating control unit HCU reports the fault to the engine control unit ECU and turns off the heating system.

In a seventh routine for self-diagnostic of the heating control unit itself HCU, said method comprises the following steps relating to error detection in a power stage that feeds the secondary relay 12:

check, at said power stage, if an electric parameter (current, tension or resistance) is not null, close to the current values for system feeding (such as 12 V), whenever the command from the heating control unit HCU to said secondary relay 12 corresponds to the operational status turned on;

check, at said power stage, if an electric parameter (current, tension or resistance) is close to the reference value of disconnected load (around 0 V or feeding value, such as 12 V), whenever the command from the heating control unit HCU to said secondary relay 12 corresponds to the operational status turned on;

check, at said power stage, if an electric parameter (current, tension or resistance) is null, whenever the command from the heating control unit HCU to said secondary relay 12 corresponds to the operational status turned off;

if so for at least one of the above premises, the heating control unit HCU reports the fault to the engine control unit ECU and turns off the heating system.

In an eight routine for self-diagnostic of the heating control unit itself HCU, said method comprises the following steps relating to the detection of a communication error between the heating control unit HCU and the engine control unit ECU:

verify the check sum received in a message, and compare it with a value calculated according to the remaining content of the respective message (within a time interval) and its identifier;

if the check sum received differs from the calculated value, determine the communication error in the data connection mean, and the heating control unit HCU reports the fault to the engine control unit ECU and turns off the heating system.

In a ninth routine for self-diagnostic of the heating control unit itself HCU, said method comprises the following steps relating to detection of memory integrity:

the heating control unit HCU checks the RAM memory integrity of its respective microcontroller, by writing at least one value at said RAM memory, and then by reading it; in the event of non-conformity between the value written and read, the heating control unit HCU reports the fault to the engine control unit ECU and turns off the heating system;

the heating control unit HCU checks the integrity of the EEPROM memory through a cyclic redundancy check (CRC); upon detection of a fault, the heating control unit HCU reports the fault to the engine control unit ECU and turns off the heating system, until the system energy feeding is turned off and once more re-established; and the heating control unit HCU checks the integrity of the flash memory through a cyclic redundancy check; upon detection of an error, the heating control unit HCU reports the fault to the engine control unit ECY and turns off the heating system, until the system energy feeding is turned off and once more re-established.

In a tenth routine for self-diagnostic of the heating control unit itself HCU, said method comprises the following steps relating to the detection of integrity of its respective microcontroller:

monitor a reset counter associated with the respective microcontroller of the heating control unit itself HCU to check any unexpected resets;

if the reset counter value exceeds a predetermined value of occurrences per conduction cycle, the heating control unit HCU must turn off the heating system.

It is worth pointing out that the above description is exclusively intended to provide exemplary illustrations of the specific embodiment of this invention. Therefore, any modifications, variations and constructive combinations of elements that substantially play the same role to achieve the same results are within the scope of protection as limited only by the attached claims.

What is claimed is:

1. A method for self-diagnostic of a fuel heating system including at least one engine control unit (ECU) that includes a respective microcontroller, and at least one heating control unit (HCU) that includes a respective microcontroller, both being fed by at least one tension source (10) and interconnected to each other and to at least one heating element (13) through an electronic circuit that still includes at least one main relay (11) and at least one secondary relay (12), wherein the heating control unit (HCU):

performs a diagnostic of at least one heating element (13) based on at least one of the following: short-circuit detection for one grounding spot, short-circuit detection for the tension source (10), open circuit detection and overheating detection;

performs a diagnostic of an operational status of said at least one secondary relay (12);

performs a diagnostic of itself and of respective data connection means (14) based on at least one of the following: overheating detection routines in a printed circuit board, ground shift displacement detection; error detection in a power stage, communication error detection, memory integrity detection and integrity detection in relation to the respective microcontroller.

2. The method for self-diagnostic of a fuel heating system according to the claim 1, wherein, in relation to the diagnostic of at least one heating element (13), said method comprises the following steps relating to the detection of short-circuit in a ground spot:

check the heating elements (13) by measuring a first electric parameter at said at least one heating element (13 during activity thereof, and by comparing an amount with a reference value;

if the measured amount exceeds the reference value, verify a need of replacing said at least heating element (13) and/or a need of repairing the short-circuit between the heating control unit HCU and said at least one heating element (13).

3. The method for self-diagnostic of a fuel heating system according to the claim 1, wherein, in relation to the diagnostic of at least one heating element (13), said method comprises the following steps relating to the detection of short-circuit in the tension source (10):

check the heating elements (13) by measuring a second electric parameter at said at least one heating element (13) while said at least one heating element (13) is inactive, and by comparing an amount with a reference value;

if the measured amount exceeds zero, verify a need of replacing said at least heating element (13) and/or a need of repairing the short-circuit between the heating control unit HCU and said at least one heating element (13).

4. The method for self-diagnostic of a fuel heating system according to the claim 1, wherein, in relation to the diagnostic of the at least one heating element, said method comprises the following steps relating to detection of an open circuit:

check the heating elements (13) by measuring a first electric parameter at said at least one heating element (13) and by comparing an amount with a reference value;

if, for a predetermined period, the measured amount of the second electric parameter is lower than a reference value, a fault is reported by the heating control unit (HCU) to the engine control unit (ECU) and the heating system is turned off.

5. The method for self-diagnostic of a fuel heating system according to the claim 1, wherein, in relation to the diagnostic of the at least one heating element, said method comprises the following steps relating to overheating detection:

check the heating elements (13) by measuring a third electric parameter at said at least one heating element (13) and by comparing an amount with a reference value;

if, for a predetermined period, the measured amount exceeds a predetermined limit, measure a first electric parameter at said at least one heating element (13); if the first electric parameter exceeds a predetermined limit, a fault is reported by the heating control unit (HCU) to the engine control unit (ECU) and the heating system is turned off.

6. The method for self-diagnostic of a fuel heating system according to the claim 1, wherein, in relation to the diagnostic of the operational status of the at least secondary relay (12), said method comprises the following steps:

check said at least one secondary relay (12), by measuring a second electric parameter in a feeding terminal of the heating control unit HCU, and by comparing the second electric parameter with a reference value;

if, upon activation of a command to close said at least one secondary relay (12), a measured value of the second electric parameter is null, make sure that the at least one secondary relay (12) is locked in a first operational status and the heating control unit HCU shall report the fault to the engine control unit ECU and shall turn off the heating system;

if, upon activation of a command to open said at least one secondary relay (12), the measured value of the second electric parameter is not null, make sure that the at least one secondary relay (12) is locked in a second operational status and the heating control unit HCU shall report a fault to the engine control unit ECU and shall turn off the heating system; in this case, indicate a diagnostic trouble code (DTC) and perform additional attempts to open the at least one secondary relay (12).

7. The method for self-diagnostic of a fuel heating system according to the claim 1, wherein, in relation to the self-diagnostic of the heating control unit (HCU), said method comprises the following steps:

check a feeding terminal of the heating control unit (HCU) by measuring a second electric parameter thereof, and by comparing the second electric parameter with reference values;

if, upon activation of a command to close said at least one secondary relay, a measured value of the second electric parameter is not null and lower than a first reference value, verify a sub-tension in the feeding terminal of the heating control unit HCU and this latter reports a fault to the engine control unit ECU and turns off the heating system;

if, upon activation of a command to close said at least one secondary relay (12), the measured value of the second electric parameter is not null and lower than a second reference value, and lower than the first reference value, verify a non-detection of electric feeding in the feeding terminal of the heating control unit HCU and this latter reports a fault to the engine control unit ECU and turns off the heating system;

if, upon activation of a command to close said at least one secondary relay (12), the measured value of the second electric parameter is not null and higher than a third reference value, verify a power overload in the feeding terminal of the heating control unit HCU and this latter reports a fault to the engine control unit ECU and turns off the heating system.

8. The method for self-diagnostic of a fuel heating system according to the claim 1, wherein, in relation to the self-diagnostic of the heating control unit (HCU), said method comprises the following steps relating to overheating detection at a printed circuit board of the heating control unit (HCU):

measure a temperature of the printed circuit board of the heating control unit (HCU) at a region close to a feeding terminal of the heating control unit (HCU);

if the measured temperature is higher than a reference value, verify overheating, inactivate all the heating elements (13) and the heating control unit (HCU) shall report a fault to the engine control unit (ECU).

9. The method for self-diagnostic of a fuel heating system according to the claim 1, wherein, in relation to the self-diagnostic of the heating control unit (HCU), said method comprises the following steps relating to overheating detection in a printed circuit board of the heating control unit (HCU):

measure a temperature of the printed circuit board of the heating control unit (HCU) at a region where power stages are placed;

if the measured temperature exceeds a reference value, verify overheating, inactivate all the heating elements (13) and the heating control unit (HCU) shall report a fault to the engine control unit (ECU).

10. The method for self-diagnostic of a fuel heating system according to the claim 1, wherein, in relation to the self-diagnostic of the heating control unit (HCU), said method comprises the following steps relating to overheating detection in a printed circuit board of the heating control unit (HCU):

measure a temperature of the printed circuit board of the heating control unit (HCU) at a region close to a microcontroller;

if the measured temperature exceeds a reference value, verify overheating, inactivate all the heating elements (13) and the heating control unit (HCU) shall report a fault to the engine control unit (ECU).

11. The method for self-diagnostic of a fuel heating system according to the claim 1, wherein, in relation to the self-diagnostic of the heating control unit (HCU), said method comprises the following steps relating to the detection of ground shift displacement between the heating control unit (HCU) and a respective grounding spot of said at least one heating element (13):

measure a ground shift displacement between the heating control unit (HCU) and the respective grounding spot of said at least heating element (13);

if the measured ground shift displacement exceeds a first reference value, verify that the ground shift displacement is above a positive limit, report a fault to the engine control unit (ECU) and turn off the heating system;

if the measured ground shift displacement is below a second reference value, verify that the ground shift displacement is below a negative limit, report a fault to the engine control unit and turn off the heating system.

12. The method for self-diagnostic of a fuel heating system according to the claim 1, wherein, in relation to the self-diagnostic of the heating control unit (HCU), said method comprises the following steps relating to error detection at a power stage that feeds said at least one heating element (13):

check, at said power stage, if an electric parameter is not null, whenever a command of the heating control unit (HCU) to said at least one heating element (13) corresponds to an operational status turned off;

check, at said power stage, if an electric parameter is null, whenever the command of the heating control unit (HCU) to said at least one heating element (13) corresponds to the operational status turned on;

if so for at least one of the above premises, the heating control unit (HCU) shall report a fault to the engine control unit (ECU) and turn off the heating system.

13. The method for self-diagnostic of a fuel heating system according to the claim 1, wherein, in relation to the self-diagnostic of the heating control unit (HCU), said method comprises the following steps relating to error detection at a power stage that feeds the at least one secondary relay (12):

Check, at said power stage, if an electric parameter is not null, close to a current system feeding values, whenever a command of the heating control unit (HCU) to said at least one secondary relay (12) corresponds to an operational status turned on;

Check, at said power stage, if an electric parameter is close to a reference value for a disconnected load, whenever the command of the heating control unit (HCU) to said at least one secondary relay (12) corresponds to the operational status turned on;

check, at said power stage, if an electric parameter is null, whenever the command of the heating control unit (HCU) to said at least one secondary relay (12) corresponds to the operational status turned off;

if so for at least one of the above premises, the heating control unit (HCU) shall report a fault to the engine control unit (ECU) and turn off the heating system.

14. The method for self-diagnostic of a fuel heating system according to the claim 1, wherein, in relation to the self-diagnostic of the heating control unit (HCU), said method comprises the following steps relating to the detection of a communication error between the heating control unit (HCU) and the engine control unit (ECU):

verify a check sum received in a message, and compare it with a calculated value;

if the check sum received differs from the calculated value, determine a communication error in the respective data connection means, and the heating control unit HCU reports a fault to the engine control unit ECU and turns off the heating system.

15. The method for self-diagnostic of a fuel heating system according to the claim 1, wherein, in relation to the self-diagnostic of the heating control unit (HCU), said method comprises the following steps relating to detection of memory integrity:

the heating control unit HCU checks a RAM memory integrity of its respective microcontroller, by writing at least one value at said RAM memory, and then by reading it; in the event of non-conformity between the value written and read, the heating control unit HCU reports a fault to the engine control unit ECU and turns off the heating system;

the heating control unit HCU checks an integrity of the EEPROM memory through a cyclic redundancy check (CRC); upon detection of a fault, the heating control unit HCU reports the fault to the engine control unit ECU and turns off the heating system; and the heating control unit HCU checks an integrity of the flash memory through a cyclic redundancy check; upon detection of a fault, the heating control unit HCU reports the fault to the engine control unit ECU and turns off the heating system.

16. The method for self-diagnostic of a fuel heating system according to the claim 1, wherein, in relation to the self-diagnostic of the heating control unit (HCU), said method comprises the following steps relating to detection of integrity of its respective microcontroller:

monitor a reset counter associated with the respective microcontroller of the heating control unit (HCU);

if a value pointed by the reset counter exceeds a predetermined value of occurrences per conduction cycle, the heating control unit (HCU) turns off the heating system.

* * * * *